United States Patent Office 2,884,406
Patented Apr. 28, 1959

2,884,406
PRODUCTION OF CURED EPOXIDE RESINS

Richard Wegler and Günter Frank, Leverkusen, Germany, assignors to Farbenfabriken Bayer Aktiengesellschaft, Leverkusen, Germany, a corporation of Germany No Drawing. Application September 11, 1956
Serial No. 609,086

Claims priority, application Germany October 4, 1955

6 Claims. (Cl. 260—47)

This invention relates to the production of cured epoxide resins.

It is known that non-basic organic compounds containing more than one epoxy radical per molecule such as polyepoxides of dihydric and polyhydric phenols (especially of 4,4'-dihydroxydiphenyl-dimethylmethane and derivatives thereof), of dihydric and polyhydric alcohols (for example glycols, glycerine and trimethylol propane), furthermore glycol-bis-1,2-epoxy-4,7-methanoperhydro-indane-5-ether, furthermore butadienedioxide, for example, can be converted into cross-linked plastics by heating for a relatively long time with cyclic acid anhydrides (for example phthalic anhydride, tetrahydro phthalic anhydride, hexahydrophthalic anhydride, maleic anhydride or succinic anhydride) or with polybasic acids (carboxylic acids, such as for example citric acid, tartaric acid, maleic acid, itaconic acid, succinic acid or adipic acid: sulphonic acids, such as for example benzene-disulphonic acid; inorganic acids, such as for example phosphoric acid). The advantage of using cyclic acid anhydrides as compared with the acids mentioned above is that no hydroxyl groups are formed in the cross-linking (polyester formation) and that the anhydrides cross-link with polyepoxides completely without giving off volatile components ($H_2O$). Such combinations are used in practice inter alia as casting resins, surfacing materials, lacquers, adhesives and electric insulating materials. As regards the constitution and preparation of the non-basic polyepoxide compounds compare for instance United States patent specifications Nos. 2,324,483, 2,581,464, 2,642,412. As used herein the term "non-basic" denotes a polyepoxy-compound which contains neither a nitrogen containing group nor any other basic group.

A fact which is occasionally disadvantageous is that the curing times of such combinations are too long or the hardening temperatures, for example for molding masses, cold-hardening lacquers and casting resins for electrical purposes are too high. It is true that the curing of the aforementioned di- and polyepoxides with cyclic anhydrides under heat can be accelerated by the addition of tertiary amines, but these amines have the disadvantage that they are volatile and are not incorporated into the polyesters which are formed. It is also known that diamines with primary and tertiary amino groups can be used as accelerators. These are incorporated chemically into the resin molecule, but have the disadvantage that they bind some of the epoxide groups or carboxyl groups and thus modify the technical properties of the hardened products obtained.

It has now been found that, in the presence of basic di- and polyepoxides, the reaction of non-basic di- and poly epoxides with cyclic acid anhydrides or polybasic organic or inorganic acids is accelerated without the aforementioned disadvantages, so that simultaneously the hardening times are shortened or the hardening temperature is lowered.

Accelerators especially suitable for the hardening are organic nitrogen compounds which contain more than one epoxide radical. These epoxide radicals are preferably connected in the form of 2-3-epoxypropyl groups to one or several nitrogen atoms of the accelerator. Such compounds correspond to the general formulae:

(I)

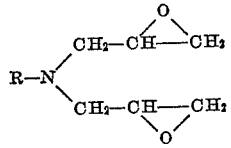

(II)

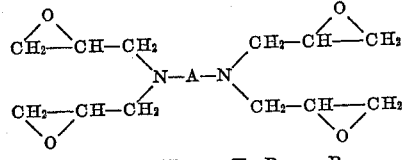

(III)

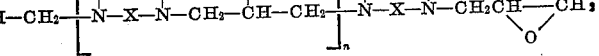

in which R represents an aryl, alkyl, cycloalkyl, aralkyl or heterocyclic radical such as for example a phenyl, chlorophenyl, toluyl, anisyl, naphthyl, methyl, ethyl, propyl, isopropyl, butyl, isobutyl, heptyl, stearyl or benzyl radical, $R_1$ represents an alkyl or cycloalkyl radical, such as for example a methyl, ethyl, propyl, isopropyl, butyl or cyclohexyl radical, $n$ represents zero or a whole number, preferably of 1–6, and X represents a divalent aliphatic or aromatic organic radical, such as for example an ethylene, a diethylene ether, phenylene, naphthylene, diphenylene or a diphenylene-ketone radical, or preferably a diphenylene-methane radical of the general formula

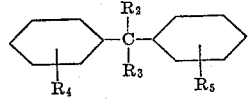

in which $R_2$ and $R_3$ represent hydrogen atoms or alkyl such as methyl, ethyl, propyl, cycloalkyl such as cyclohexyl such as benzyl radicals, it being possible for $R_2$ and $R_3$ to be the same or different and moreover to form part of a cycloaliphatic ring, and $R_4$ and $R_5$ represent hydrogen or halogen atoms or alkyl or alkoxy radicals. A represents a divalent aromatic organic radical such as those designated with X.

Basic diepoxides of the general Formulae I and II are for example obtained according to U.S. application Serial No. 551,212 wherein free amines are reacted with epichlorhydrin to form the corresponding di-(hydroxy-chloropropyl)-amines and these are treated with aqueous caustic alkali solution. Examples of such compounds are N-di-2,3-epoxypropyl aniline, N-di-2,3-epoxypropyl butylamine, N-di-2,3-epoxypropyl methylamine, bis-(N-di-epoxypropyl-aminophenyl)methane, bis-(N-diepoxypropyl-aminophenyl) dimethylmethane and bis-(4N-diepoxypropyl-amino-3-chloro-phenyl) methane.

Compounds of the general Formula III are for example obtained according to U.S. application Serial No. 551,236, filed December 6, 1955, wherein secondary diamines are reacted with epichlorhydrin or glycerine dichlorhydrin and then hydrogen chloride is split off from the dichlorhydrins which are formed. The chain length of the diepoxides formed depends on the proportion of epichlorhydrin or glycerine dichlorhydrin which is used. Especially suitable secondary diamines in such cases are: 4,4'-dimonomethyl (ethyl, propyl, butyl) amino-diphenyl-methane, 4,4'-dimonomethyl-(ethyl-)-amino-3,3'-dichlorodiphenylmethane and N,N'-diisopropyl-p-phenylene diamine.

The basic di- or polyepoxides can be added in any desired proportion to the non-basic diepoxides and polyepoxides. The cyclic acid anhydrides, the polybasic organic or inorganic acids or mixtures of said compounds which are to be employed as hardening agents, should preferably be used in such an amount as is equivalent to the total amount of basic and non-basic diepoxide or polyepoxide actually used. Larger or smaller amounts of acid anhydrides can however also be used for prehardening purposes.

As accelerators, the basic diepoxides and polyoxides are advantageously used in a proportion of 0.1–5% by weight, preferably 0.1–1%, calculated on the non-basic polyepoxide compounds to be hardened.

The reaction conditions for the production of plastics by reacting non-basic diepoxides or polyepoxides with cyclic acid anhydrides and/or polybasic organic or inorganic acids in the presence of basic diepoxides or polyepoxides depend on the state of aggregation of the basic and non-basic diepoxides or polyepoxides which are used. If these compounds are liquid, they are mixed and the hardening is carried out at elevated temperature after addition of the aforementioned acid anhydrides or organic or inorganic acids serving as hardening agents. If one epoxide compound is solid, the hardening reaction is carried out in the melt. The hardening temperatures in such cases are preferably between 80–150° C., although lower or higher temperatures may be used. By simultaneously using different amounts of non-basic di- or polyepoxides, it is also possible additionally to influence the degree of cross-linking. On the other hand, not only can the catalytic effect be influenced by the basic diepoxides or polyepoxides, but it can also be influenced by varying the degree of basicity of the basic diepoxides or polyepoxides.

The advantageous catalytic effect of the said basic diepoxides as compared with amines containing no epoxide, is that the basic diepoxides are concurrently cross-linked and do not show any chain-breaking effect. Since the said pure diepoxides meet with cyclic anhydrides to produce plastics with excellent mechanical and electrical values, the proportion of the basic polyepoxides chosen can be as high as desired. In this way, it is possible to produce cold-hardening polyester-based lacquers with high-grade properties.

The following examples further illustrate the invention.

*Example 1*

The catalytic efficacy of the basic diepoxides or polyepoxides is most clearly shown by comparison of the gelling times.

An epoxide resin is prepared by mixing 1 mol of 4.4′-dihydroxydiphenylmethane with 2 mols of epichlorhydrin. To this mixture there are slowly added at 80–100° C. an aqueous solution of sodium hydroxide in a quantity sufficient to bind the hydrochloric acid formed during the reaction between the aforementioned components. After the resin which is formed has reached the desired consistency, the resin is washed free from alkali and the water is removed in vacuum.

The resin thus obtained has an epoxide equivalent of 0.256 per 100 g. of resin. It gels at 120° C. after 5½ to 6 hours after being mixed with the equivalent amount of phthalic anhydride. By adding varying amounts of N-2,3-diepoxypropyl aniline, the gelling times were shortened as follows:

| Epoxide resin in g. | N-diepoxy-propyl-aniline in g. | Phthalic anhytride in g. | Gelling time, hours |
|---|---|---|---|
| 10 | ------ | 3.8 | 5½–6 |
| 10 | 0.1 | 3.8 | about 2 |
| 10 | 0.4 | 4.3 | about 2 |
| 10 | 0.8 | 4.8 | 1 |
| 10 | 1 | 5.2 | 1 |

The N-diepoxy propyl aniline is prepared as follows:

A mixture of 400 g. of epichlorhydrin (4 mol=370 g.) and 400 cc. of methanol is heated to boiling point. 2 mols of aniline are then added dropwise over a period of 15 minutes and the solution boiled for 3 hours under reflux. The alcohol is then distilled off, 200 cc. of benzene are added, and 600 cc. of 44% sodium hydroxide solution are added dropwise at 20–25° C. over a period of 30 minutes. The mixture is vigorously stirred for another three hours and then such an amount of water is added that all the precipitated sodium chloride re-dissolves. The layers are then separated. The benzene solution of the diepoxide is briefly dried with solid potassium hydroxide and distilled. The fraction having the boiling point$_{0.15}$: 136–138° C. is the pure diepoxide, which is a light yellow highly mobile oil. Yield: 314–340 grams=76–82% of the theoretical.

Analysis for $C_{12}H_{15}O_2N$—Calculated: C, 70.24%; H, 7.31%; N, 6.84%; O, 15.61%. Found: C, 70.20%; H, 7.45%; N, 6.80%; O, 15.65%.

*Example 2*

Epoxide resin as in Example 1, N-di-2,3-epoxypropyl-propylamine was used as catalyst. Hardening temperature: 120° C.

| Epoxide resin in g. | N-diepoxy-propyl propylamine in g. | Phthalic anhydride in g. | Gelling times |
|---|---|---|---|
| 10 | ------ | 3.8 | 6 hours. |
| 10 | 0.5 | 4.6 | 12 minutes. |
| 10 | 0.2 | 4 | 20 minutes. |
| 10 | 0.1 | 3.8 | 28 minutes. |
| 10 | 0.05 | 3.8 | 46 minutes. |

The N-di-2.3-epoxypropyl-propylamine is prepared as follows:

59 grams of n-propylamine (1 mol) are added dropwise to 200 g. of epichlorhydrin (2 mols=185 grams) while stirring at 28–32° C. over a period of 30 minutes; for four hours. The mixture is cooled to 20° C., and 300 cc. of 44% sodium hydroxide solution are added dropwise over a period of 30 minutes at 20–25° C. The mixture is stirred for 3 hours and then diluted with about 300 cc. of water, whereupon all the sodium chloride precipitated re-dissolves. The resulting mixture is allowed to settle and the upper layer is separated off; this layer is shaken for a short time with cold 50% potassium hydroxide solution, and then the upper layer is separated and distilled under water jet vacuum (B.P.$_{.12}$=105–120° C.); by rectification, 122 g.=71% diepoxypropane propylamine (B.P.$_{.12}$=113–115° C.) are obtained. The diepoxide is a crystal-clear highly mobile liquid which becomes slightly yellowish in color after standing for a relatively long period.

Analysis for $C_9H_{17}O_2N$—Calculated: C, 63.15%; H, 9.94%; O, 18.71%; N, 8.18%. Found: C, 62.75%; H, 10.00%; O, 19.00%; N, 8.1%

*Example 3*

Epoxide resin as in Example 1. Catalyst: NN′-di-2.3-epoxypropyl-dimethylamino-diphenylmethane. Hardening temperature: 120° C.

| Epoxide resin in g. | N,N′-diepoxy-propyl methylamino-diphenyl methane in g. | Phthalic anhydride in g. | Gelling times |
|---|---|---|---|
| 10 | ------ | 3.8 | 6 hours. |
| 10 | 0.5 | 4.5 | 10 mins. |
| 10 | 0.1 | 3.8 | 21 mins. |

The N.N′-di-2.3-epoxypropyl-dimethylamino-diphenylmethane is prepared as follows:

1582 g. (=7 mols) of 4.4′-di-(mono-methylamino)- diphenylmethane are dissolved in 1.4 liters of benzene. The mixture is boiled and 1400 grams of epichlorhydrin are added dropwise at the boiling point over a period of 2–2½ hours while stirring. The mixture is heated for a further 15 hours while stirring, cooled to 20° C., and 2.1 liters of 44% sodium hydroxide solution are added dropwise over a period of two hours. The temperature is preferably not allowed to exceed 30° C. After addition of the sodium hydroxide solution the mixture is stirred vigorously for 15 hours at room temperature and such an amount of water is added that the precipitated sodium chloride just enters into solution (1.5 liters); settlement is allowed to take place and the layers are separated. The benzene solution is briefly dried with solid potassium hydroxide and the benzene is distilled off. The last traces of solvent are removed under high vacuum. A resin is obtained which is still liquid and light brown in color. Yield: 2322 grams=98% of the theoretical.

Analysis for $C_{21}H_{25}O_2N_2$—Calculated: C, 74.55%; H, 7.69%; N, 8.28%; O, 9.46%. Found: C, 74.40%; H, 7.91% N, 8.00%; O, 9.40%.

Example 4

Epoxide resin as in Example 1. Catalyst: Bis-(N-diepoxypropylaminophenyl)-methane. Hardening temperature: 120° C.

| Epoxide resin in g. | Catalyst in g. | Phthalic anhydride in g. | Gelling times |
|---|---|---|---|
| 10 | ------- | 3.8 | 6 hours. |
| 10 | 0.1 | 3.8 | 1 hour. |
| 10 | 0.5 | 4.5 | 37 minutes. |
| 10 | 1.0 | 5 | 26 minutes. |

The catalyst is obtained as follows:

396 g. (2 mols) of 4,4'-diamino-diphenylmethane are dissolved in 500 ml. of methanol. To the boiling solution there are added drop by drop 800 g. of epichlorhydrin, whereafter the mixture is refluxed for 10 hours. The methanol is distilled off and 1 litre of benzene is added. To this solution there are added 1.2 litres of a 40% aqueous solution of NaOH at 20–25° C. within a period of 1–5 hours. The mixture is kept stirring for 15 hours, thereafter 2 litres of water are added, the layer of benzene is isolated and washed with sodium chloride solution. The benzene is partially distilled off until clear water free solution is obtained. This is filtered and the rest of the solvent is distilled off. There are obtained 823 g. of a yellow, viscous resin with an epoxide equivalence of 150–170. In analogous manner there may be obtained and used accelerators of the following formulae:

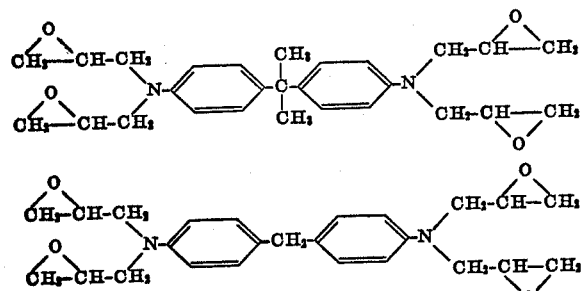

Example 5

Epoxide compound as in Example 1. Hardener: hexahydrophthalic anhydride. Catalyst: N-di-2.3-epoxypropyl-propylamine. Hardening temperature: 120° C.

| Epoxide resin in g. | Catalyst in g. | Hardener in g. | Gelling times |
|---|---|---|---|
| 10 | ------- | 7.4 | 6 hours. |
| 10 | 0.1 | 7.4 | 8 minutes. |
| 10 | 0.5 | 8 | 3 minutes. |
| 10 | 1.0 | 8.6 | 1 minute. |

Example 6

Epoxide compound as in Example 1. Hardener: hexahydrophthalic anhydride. Catalyst: N,N'-tetra-2.3-epoxypropylaminodiphenyl methane. Hardening temperature: 120° C.

| Epoxide resin in g. | Catalyst in g. | Hardener in g. | Gelling times |
|---|---|---|---|
| 10 | ------- | 7.4 | 6 hours. |
| 10 | 0.1 | 7.4 | 124 minutes. |
| 10 | 0.5 | 8 | 77 minutes. |
| 10 | 1 | 8.6 | 37 minutes. |

What we claim is:

1. In a process of curing a non-basic polyglycidyl ether of a compound selected from the group consisting of a polyhydric alcohol and a polyhydric phenol at elevated temperature by means of a curing amount of a curing compound selected from the group consisting of a cyclic acid anhydride, a polybasic organic acid, and an inorganic acid, the improvement which comprises curing said polyglycidyl ether in admixture with said curing compound and in admixture with 0.1–5% by weight, based on the polyglycidyl ether, of an organic tertiary amine catalyst containing at least one tertiary nitrogen atom to which is bound at least one 2,3-epoxypropyl group, at least two 2,3-epoxypropyl groups being present in said catalyst, said catalyst containing no other groups reactive with polyglycidyl ethers and acid anhydrides.

2. The process of claim 1, wherein the tertiary amine is selected from the group of compounds of the formulae:

(I) 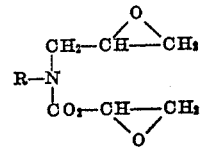

in which R represents a radical selected from the group consisting of aryl, alkyl and aralkyl radicals;

(II) 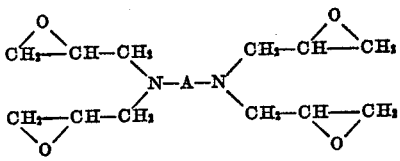

in which A represents a divalent aromatic radical;

(III) 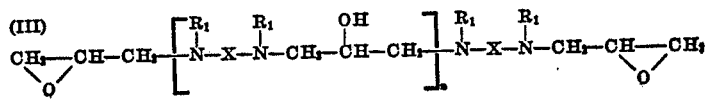

in which $R_1$ represents a radical selected from the group consisting of alkyl and cycloalkyl radicals, $n$ represents 0–6, and X represents a divalent aliphatic or aromatic organic radical, including a diphenylene methane radical of the general formula

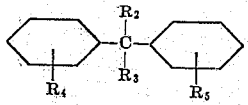

in which $R_2$ and $R_3$ each represent hydrogen atoms, alkyl, cycloalkyl, and aralkyl radicals, $R_2$ and $R_3$ together form part of a cycloaliphatic ring, and $R_4$ and $R_5$ represent hydrogen, halogen, alkyl, and alkoxy radicals.

3. Resins produced by the process of claim 1.

4. A composition of matter comprising (1) a non-basic polyglycidyl ether of a compound selected from the group consisting of a polyhydric alcohol and a polyhydric phenol, (2) a compound selected from the group consisting of cyclic acid anhydride, a polybasic organic acid, and an inorganic acid, and (3) a tertiary amine catalyst containing at least one tertiary nitrogen atom to which is bound at least one 2,3-epoxypropyl group, at least two 2,3-epoxypropyl groups being present in said amine.

5. Composition of claim 4 wherein said tertiary amine is used in a proportion of 0.1 to 5% by weight based on the weight of said polyglycidyl ether.

6. In a process of curing a non-basic polyglycidyl ether of a compound selected from the group consisting of a polyhydric alcohol and a polyhydric phenol at elevated temperatures by means of a curing amount of a curing compound selected from the group consisting of a cyclic acid anhydride, a polybasic organic acid, and an inorganic acid, the improvement which comprises curing the polyglycidyl ether in admixture with said curing compound and in admixture with 0.1–5% by weight, based on the weight of the non-basic polyglycidyl ether, of an epoxyamine catalyst selected from the group consisting of N - 2,3 - diepoxy - propyl - aniline, N,N' - di - 2,3-epoxypropyl-dimethylamino-diphenylmethane, bis-(N-di-2,3-epoxypropyl-aminophenyl)-methane, N-di-2,3-epoxy-propyl - propylamine and N,N' - tetra - 2,3 - epoxypropyl-amino-diphenylmethane.

References Cited in the file of this patent

UNITED STATES PATENTS 2,730,531    Payne et al. _____ Jan. 10, 1956